United States Patent [19]
Jacobs et al.

[11] 3,891,347
[45] June 24, 1975

[54] CLUTCH-CONTROLLED, WIND-OPERATED, POWER PRODUCING PROPELLER

[76] Inventors: Marcellus L. Jacobs; Paul R. Jacobs, both of Rt. 11, Box 722, Fort Myers, Fla. 33901

[22] Filed: June 10, 1974

[21] Appl. No.: 477,757

[52] U.S. Cl. .............. 416/32; 416/44; 416/89; 416/169
[51] Int. Cl. ............................................. F03d 7/04
[58] Field of Search ............ 416/32, 41, 44, 45, 51, 416/89, 87, 169, 88, 3, 142

[56] References Cited
UNITED STATES PATENTS

| | | | |
|---|---|---|---|
| 783,163 | 2/1905 | Winn | 416/32 |
| 1,334,485 | 3/1920 | Clipfell | 416/169 X |
| 2,106,557 | 1/1938 | Putnam | 416/41 X |
| 2,464,234 | 3/1949 | Jacobs | 416/136 |
| 2,505,969 | 5/1950 | Jacobs | 416/136 |
| 3,715,171 | 2/1973 | Kettner | 416/142 |

*Primary Examiner*—Everette A. Powell, Jr.
*Attorney, Agent, or Firm*—Shoemaker and Mattare

[57] ABSTRACT

A clutch-controlled, wind-operated, multibladed power producing propeller includes a plurality of propeller blades mounted on a hub for rotation about a power output shaft, a clutch connected between the hub and output shaft and operable to remain disengaged until the propeller blades attain a predetermined speed of rotation, whereupon the clutch engages to transmit power from the propeller to the output shaft, and detent structure operatively associated with the clutch to prevent engagement of said clutch until said predetermined speed is reached.

18 Claims, 10 Drawing Figures

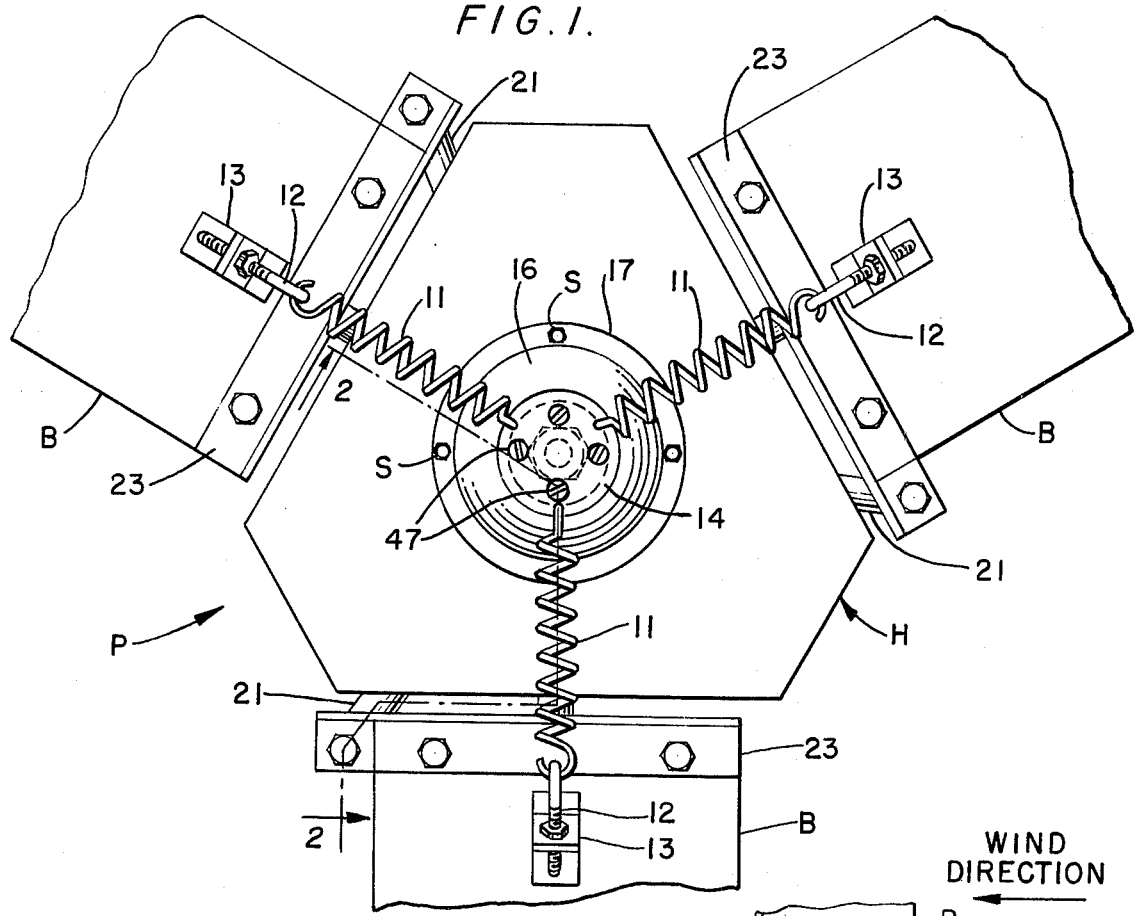
FIG. I.
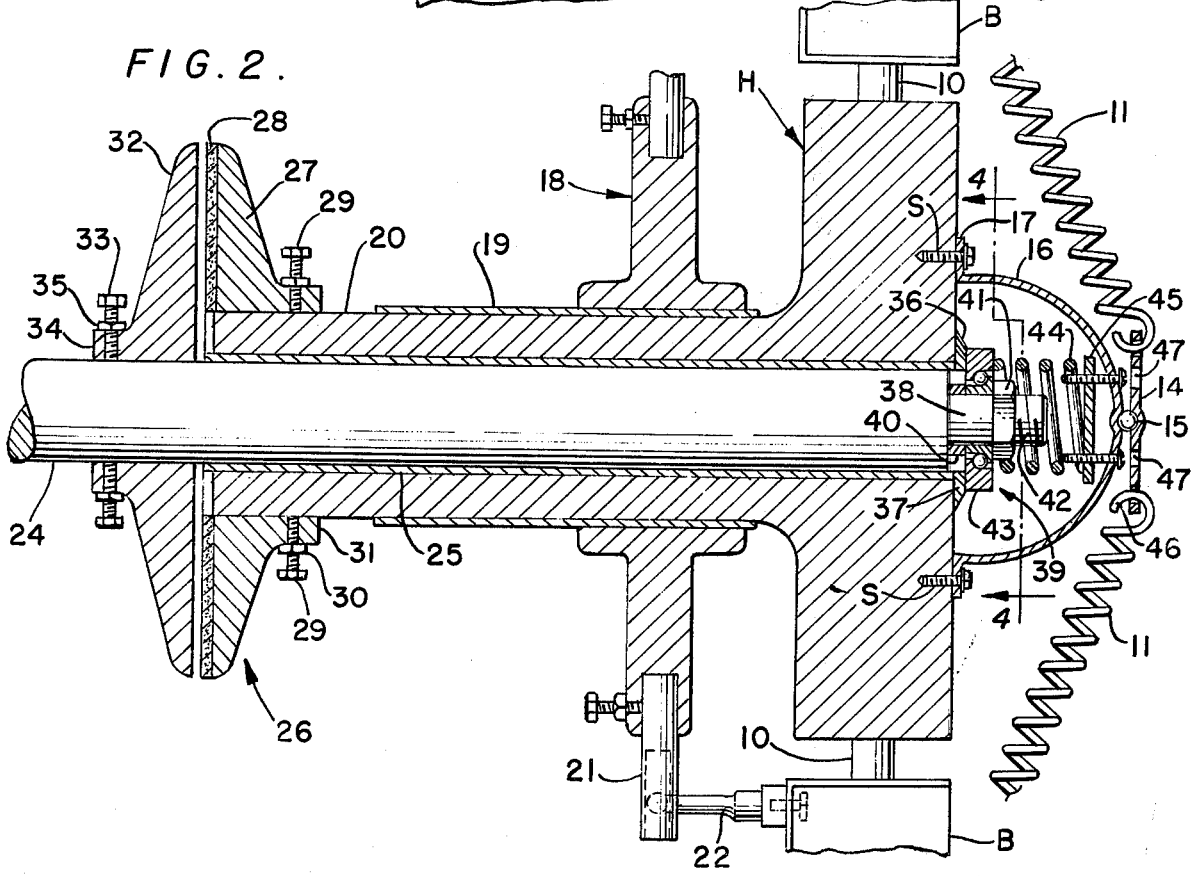
FIG. 2.

PATENTED JUN 24 1975  3,891,347

SHEET 2

WIND DIRECTION

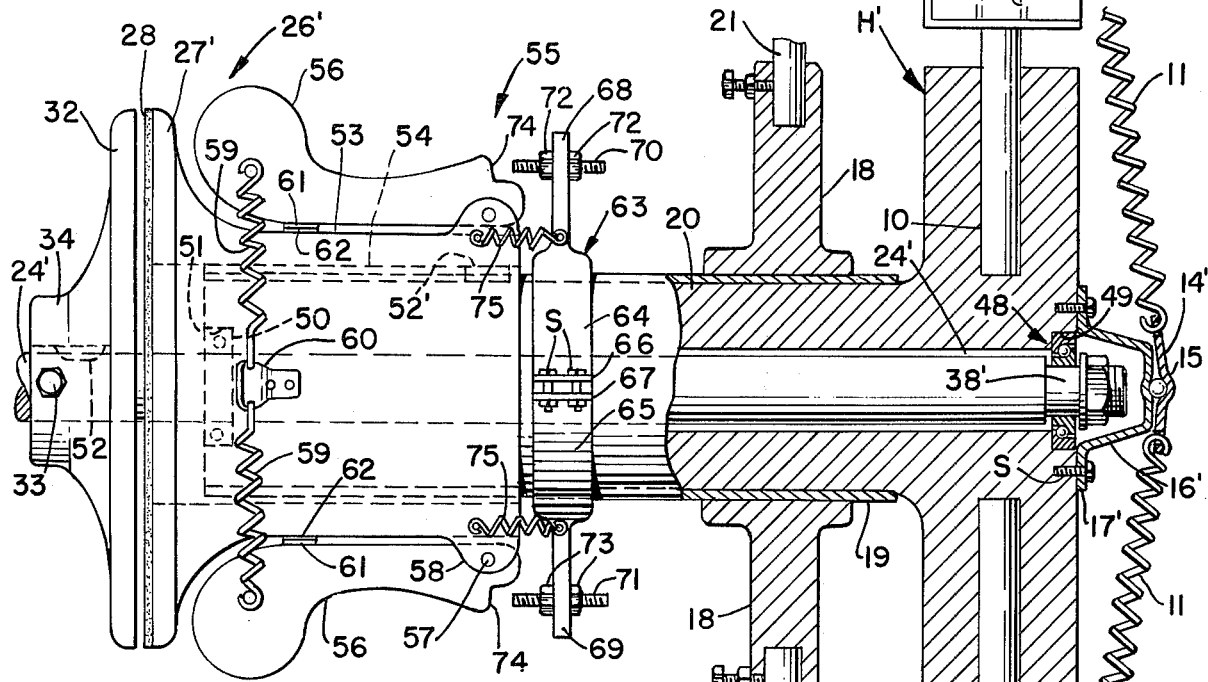
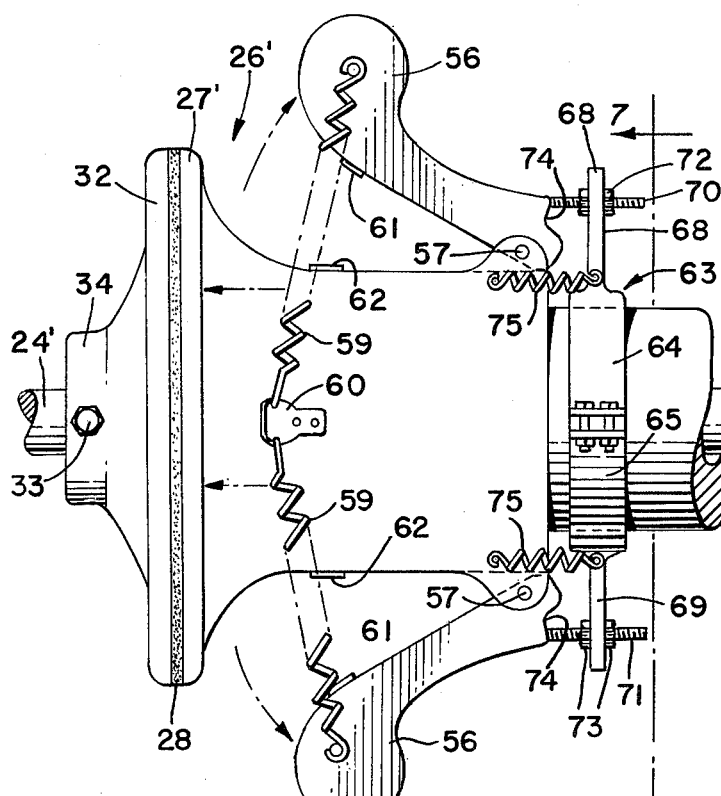
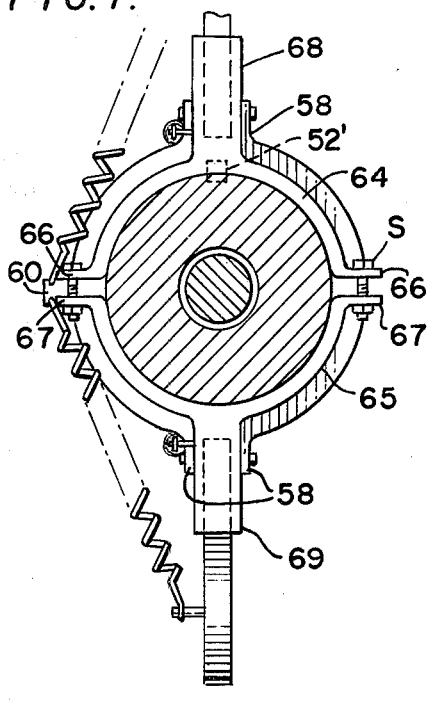

CLUTCH-CONTROLLED, WIND-OPERATED, POWER PRODUCING PROPELLER

BACKGROUND OF THE INVENTION

This invention relates to a wind-driven multiblade propeller, and more particularly, to a clutch control system for enabling the propeller to attain a predetermined speed before connection of the propeller with the power output shaft.

Wind-operated multiblade propellers are known in the prior art, and one common form of propeller has blades of the air-foil type, but because of the fact that such propellers do not produce very much power at low R.P.M. or low wind velocities due to the small area of the blade upon which the wind acts, they have not been suitable for use except in conjunction with electric generating plants or the like where low starting torque is required. In other applications, such as in compressors, water pumps, power generators or other uses where high starting torque is required, wind-operated propellers of the air-foil type have not been satisfactory.

However, propellers of the air-foil type produce an exceptional amount of power at operating speed, and the power thus produced is significantly higher than the power obtained from conventional windmill type blades. This is due to the act that when air-foil type multiblade propellers are operating at normal or operating speed, they absorb and put to use all of the wind energy of the entire area defined within the circle circumscribed by the tips of the propeller blades. Thus, by utilizing all of the wind energy within their diameter with far less blades than required by the windmill type propellers, they greatly reduce the air resistance to propeller blade travel in the rotating direction of the blades. However, as noted above, air-foil type propellers have very low starting torque and, accordingly, their use is limited to devices which do not require high starting torques, and even these uses are not satisfactory in some instances as, for example, in cold climates, wherein lubricating greases and oils and the like may become stiff and thus render the device inoperative except in very high winds.

Therefore, it is highly desirable to have some means to utilize the large power potential of air-foil type wind-operated propellers, even in cold climates and even for devices requiring high starting torques.

In accordance with the invention, a multiblade wind-operated propeller of the air-foil type is provided, wherein a clutch means is connected between the hub of the propeller and the power output shaft and operating means is connected with the clutch to engage the clutch only when the speed of rotation of the propeller reaches a predetermined velocity whereat the power produced by the propeller is sufficient to operate the means connected with the output shaft. However, in many instances, the wind velocity may be such as to just be sufficient to cause the clutch surfaces to rub against one another or repeatedly engage and disengage without ever effecting a secure coupling between the clutch surfaces, and accordingly, the clutch will be quickly worn out, thus rendering the device inoperable. Therefore, in accordance with the invention, a detent means is connected with the clutch operting means to prevent movement and engagement of the clutch until a predetermined speed has been reached at which the clutch surfaces will be firmly engaged with one another to thus prevent slippage and damage to the clutch.

Specifically, in accordance with the invention, magnet means are provided for attracting portions of the clutch operating means toward one another until the forces of attraction of the magnet means is overcome either by wind pressure or by centrifugally operated weights.

OBJECTS OF THE INVENTION

An object of the invention is to provide a wind-operated multibladed propeller, wherein a clutch means is utilized to enable the propeller to attain a predetermined operating speed before the propeller is coupled with a power output shaft means, whereby the propeller may be utilized with devices requiring high starting torques.

Another object of the invention is to provide a multiblade wind-operated propeller means of the air-foil type, wherein a clutch is utilized to couple the propeller to a power output shaft and wherein operating means is connected with the clutch to prevent engagement of the clutch until a predetermined operating speed is reached to thus enable the propeller to be used with devices requiring high starting torques and also preventing excessive wear and damage to the clutch during use.

BRIEF DESCRIPTION OF THE DRAWINGS

FIG. 1 is an enlarged, fragmentary view in elevation looking toward the front of the propeller and hub means of the invention.

FIG. 2 is an enlarged, fragmentary view in section taken along line 2—2 in FIG. 1.

FIG. 5 is a view similar to FIG. 2 of a modified form of clutch control means of the invention.

FIG. 6 is a fragmentary view of the clutch control means of FIG. 5, showing the clutch in engaged position.

FIG. 7 is an enlarged, fragmentary view in section taken along line 7—7 in FIG. 6.

DETAILED DESCRIPTION OF THE INVENTION

Figure 3:
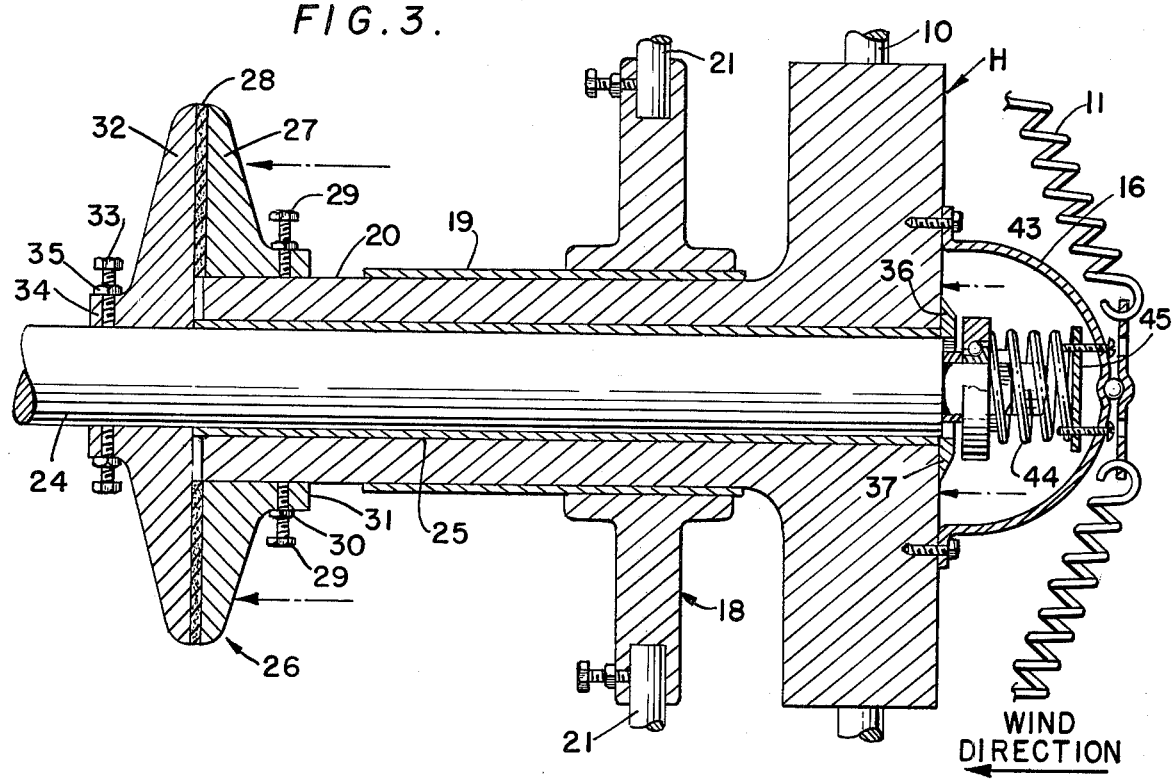
FIG. 3 is a view similar to FIG. 2 showing the clutch means engaged.
Figure 4:
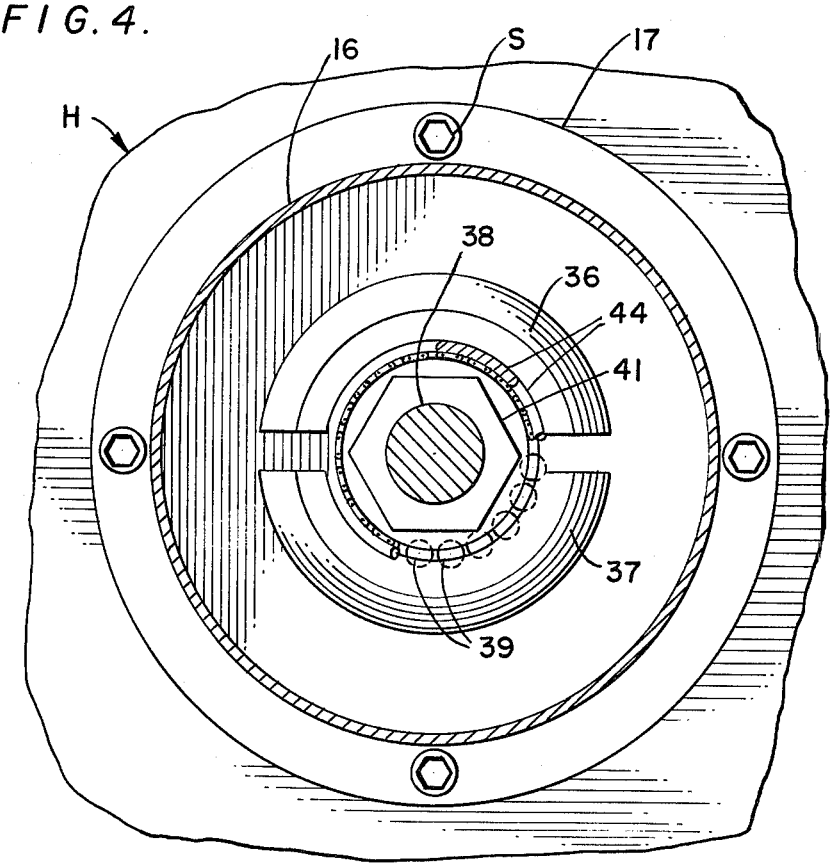
FIG. 4 is a greatly enlarged, fragmentary view taken along line 4—4 in FIG. 2.

In the drawings, wherein like reference numerals indicate like parts throughout the several views, a propeller in accordance with the invention is indicated generally at P and comprises a substantially hexagonally shaped cast one-piece hub H having a plurality of air-foil type propeller blades B mounted thereto. The propeller is mounted on the upwind side of a supporting tower, and the wind direction is from right to left, as indicated by the arrow. The blades B are slidably and rotatably mounted on radially extending rods 10 secured to the hub H and extending therefrom into sockets in the blades B. Springs 11 are connected via an eye bolt 12 and bracket 13 to the blades B at one end of the springs, and the springs are connected at their other ends to a plate 14 supported by means of a ball 15 on the outer end surface of a dome-shaped hub cover 16 secured to the front of the hub H by means of a plurality of screws or the like S extended through an annular flange 17 on the dome cover 16.

An equalizer yoke 18 is rotatably and slidably supported on a sleeve 19 of stainless steel or the like disposed on a rearwardly extending cylindrical extension 20 of the hub H, and the equalizing yoke 18 has a plurality of outwardly extending socket members 21 to which the blades B are connected by means of ball pins or studs 22 projecting rearwardly from the blades B and into the sockets 21 for effecting a change in pitch of the blades B as the speed of rotation thereof increases in a manner more fully described in U.S. Pat. No. 2,505,969.

The butt ends of the blades are secured in blade mounting brackets 23, as more fully explained in applicants' co-pending application Ser. No. 477,316 filed June 6, 1974.

As seen best in FIG. 2, a power output shaft 24 extends coaxially through the propeller hub H, and a suitable bushing 25 of bronze or the like is disposed between the cylindrical extension 20 of the hub and the output shaft 24 to slidably and rotatably support the hub on the shaft.

A clutch 26 is connected between the hub and power output shaft and comprises a first clutch unit or plate 27 having a suitable friction facing material 28 thereon and secured to the extension 20 of hub H, as by means of set screws 29 and lock nuts 30, or the like, extended through an extension 31 of the clutch unit 27 and into engagement with the outer surface of the hub extension 20.

A second clutch unit or plate 32 is secured to the output shaft 24 in spaced relation to the first clutch unit 27 by means of a plurality of set screws or the like 33 extended through an extension 34 of the second unit 32 into engagement with the shaft 24 and secured in adjusted position by lock nuts or the like 35.

A pair of substantially semicircular magnets 36 and 37 are secured to the forward end surface of the hub in any suitable manner, as by a weld or bolts or the like, in partially surrounding relationship to a forwardly projecting reduced diameter end portion 38 of the shaft 24, and a bearing means 39 is secured on the reduced diameter portion 38 in spaced relation to the forward face of hub H by means of a spacer 40 disposed around the reduced diameter portion 38 behind the bearing means 39 and a bearing retaining nut 41 threaded onto an outer threaded end portion 42 of the reduced diameter portion of the shaft and against the bearing. Magnetic attraction between the magnets 36 and 37 and the outer race 43 of the bearing thus holds the hub and propeller forwardly, with the clutch 26 disengaged. The inner race of the bearing is, of course, secured for rotation with the shaft 24, and the outer race rotates with the hub.

A clutch-return coil spring 44 is engaged between the outer race 43 and a clutch return spring adjusting plate 45, to urge the hub forwardly to enable attraction ane engagement of the magnets. The adjusting plate 45 is adjustably positioned relative to the dome cover 16 by means of a plurality of adjustment screws 46 extended through the dome and through the plate 45, so that the bias on the clutch return spring 44 can be adjusted.

Accordingly, with the structure thus described, when the propeller is at rest, the spring 44 acting between the plate 45 and outer race 43 of the bearing urges the hub H and blades B forwardly with the magnets 36 and 37 attracted to the outer race 43 of the bearing to hold the clutch members 27 and 32 disengaged. As the velocity of wind increases and the propeller begins to rotate with increasing speed, the wind pressure thereon tending to urge the propeller and hub rearwardly increases to a point where it overcomes the magnetic attraction between the magnets 36 and 37 and the bearing race 43, and accordingly, the hub H moves rearwardly with a firm, positive motion to effect a secure and firm engagement of the clutch members, thus avoiding slippage and burning of the clutch which might otherwise occur if the hub was permitted to move rearwardly gradually upon increasing wind velocity. As the wind velocity decreases and the speed of rotation of the propeller accordingly decreases, the wind pressure thereon also becomes less and the spring 44 is effective to urge the dome 16 and hub H forwardly to disengage the clutch members and once again engage the magnets 36 and 37 with the bearing outer race 43 to hold the hub forwardly until a predetermined velocity is once again reached.

Openings 47 are provided in the plate 14 for gaining access to the screws 46 on the clutch return spring adjustment means in order to adjust the bias on spring 44 to cause the spring to return the hub and propeller to the forward position seen in FIG. 2, with the clutch means disengaged, at a different wind velocity.

A modified hub and clutch assembly H' and 26', respectively, are illustrated in FIGS. 5 and 6, and in this form of the invention, the hub H' includes a cylindrical extension 20, as in the form of the invention in FIG. 1, and has a plurality of propeller blades B supported for rotation with the hub means H' by means of a plurality of radially extending rods 10 fixed to the hub and extending into bores 10a in the blades, whereby the bades may move longitudinally and rotationally on the rods 10, and blade return springs 11 are connected with the blades via the eye bolt 12 and angle bracket 13, as previously described. The springs 11 are also connected with a plate 14' which is pivotally or universally supported at a central portion thereof on a ball 15 which is, in turn, supported in a depression in the forward end of a propeller hub cover 16' secured to the forward end of the hub by means of a plurality of screws or the like S extended through a radially outwardly extended flange 17' on the hub cover 16'. As in the previously described form of the invention, a blade pitch adjusting yoke or equalizer yoke 18 is axially and rotatably supported on a sleeve 19 disposed on the cylindrical extension 20 of the hub, and the yoke is connected through spring socket extensions 21 and studs 22 with the blades B to effect changes in pitch of the blades as the centrifugal force increases and the blades move outwardly on the rods 10. However, rather than being rotatably supported on the shaft 24' by means of a bushing 25, as in the previous form of the invention, in this form of the invention the hub H' is supported on the shaft 24' by means of a first bearing 48 engaged between the reduced diameter end portion 38' of the shaft and an annular recess 49 in the forward end of the hub. A similar bearing 50 is engaged between the shaft 24' and a recess 51 in the rearward end of the hub extension 20.

The modified clutch means 26' includes a first clutch unit or plate 27' having a suitable friction material 28 affixed to the face thereof for cooperation with the confronting surface of a second clutch unit or plate 32 fixed to the shaft 24' by means of a key or the like 52 and a set screw extended through an extension 34 of the clutch unit into engagement with the shaft 24'.

The first clutch unit 27' is slidably supported on the hub extension 20 and includes a cylindrical extension 53 disposed on a bushing 54 engaged between the extension 53 and the hub extension 20, said bushing 54 preferably comprising a graphite bronze material for ease in movement of the clutch unit on the propeller hub extension. The clutch unit 27' is secured against rotation relative to the hub extension 20 by means of a key 52' or the like. Thus, the first clutch unit 27' is mounted for rotation with the hub H', and the second clutch unit 32 is mounted for rotation with the shaft 24'.

A clutch control means 55 is operatively associated with the first clutch unit 27' for effecting engagement and disengagement of the clutch, and the clutch control means comprises a plurality of fly weights 56 pivotally connected at one end thereof by means of a pivot pin 57 extended through a pair of ears 58 on the forward end of the clutch extension 53. The fly weights 56 are held inward adjacent the clutch extension 53 by means of a pair of springs 59 connected at one of their ends with the fly weights and connected at their other ends to a fly weight spring return bracket 60 affixed to one side of the clutch extension. Also, in order to maintain the fly weights in their position as seen in FIG. 5 until a predetermined speed of rotation has been reached, a pair of permanent magnets 61 and 62 are fixed to the fly weights and to the clutch extension, respectively, in aligned mutually attracting relationship.

A thrust collar 63 comprising a pair of substantially semicircular members 64 and 65 is secured to the hub extension in forwardly spaced relationship to the clutch extension 53 by means of a pair of clamping screws or bolts or the like extended through outwardly directed ears or flanges 66 and 67 on opposite sides of the hub extension, respectively. The clamping rings 64 and 65 have extensions 68 and 69 thereon, respectively, in substantial axial alignment with the fly weights 56 on the clutch, and a pair of adjusting screws 70 and 71 are extended through the extensions 68 and 69 and are secured in adjusted position by means of lock nuts 72 and 73, and the adjusting screws 70 and 71 are arranged to be abutted by thrust surfaces 74 on the fly weights 56, such that when the fly weights move outwardly, as seen in FIG. 6, the thrust surfaces 74 engage the adjustable thrust screws 70 and 71, which, reacting through the fixed thrust collar 63, causes the first clutch unit 27' to move axially rearwardly into engagement with the second clutch unit 32, thus imparting the rotation of the hub H' to the output shaft 24'. A pair of springs 75 connected between the thrust collar 63 and the clutch extension 53 returns the first clutch unit to its forward, disengaged position, as in FIG. 5, and the springs 59 connected with the fly weights return them to their inner position, as in FIG. 5.

Figure 8:
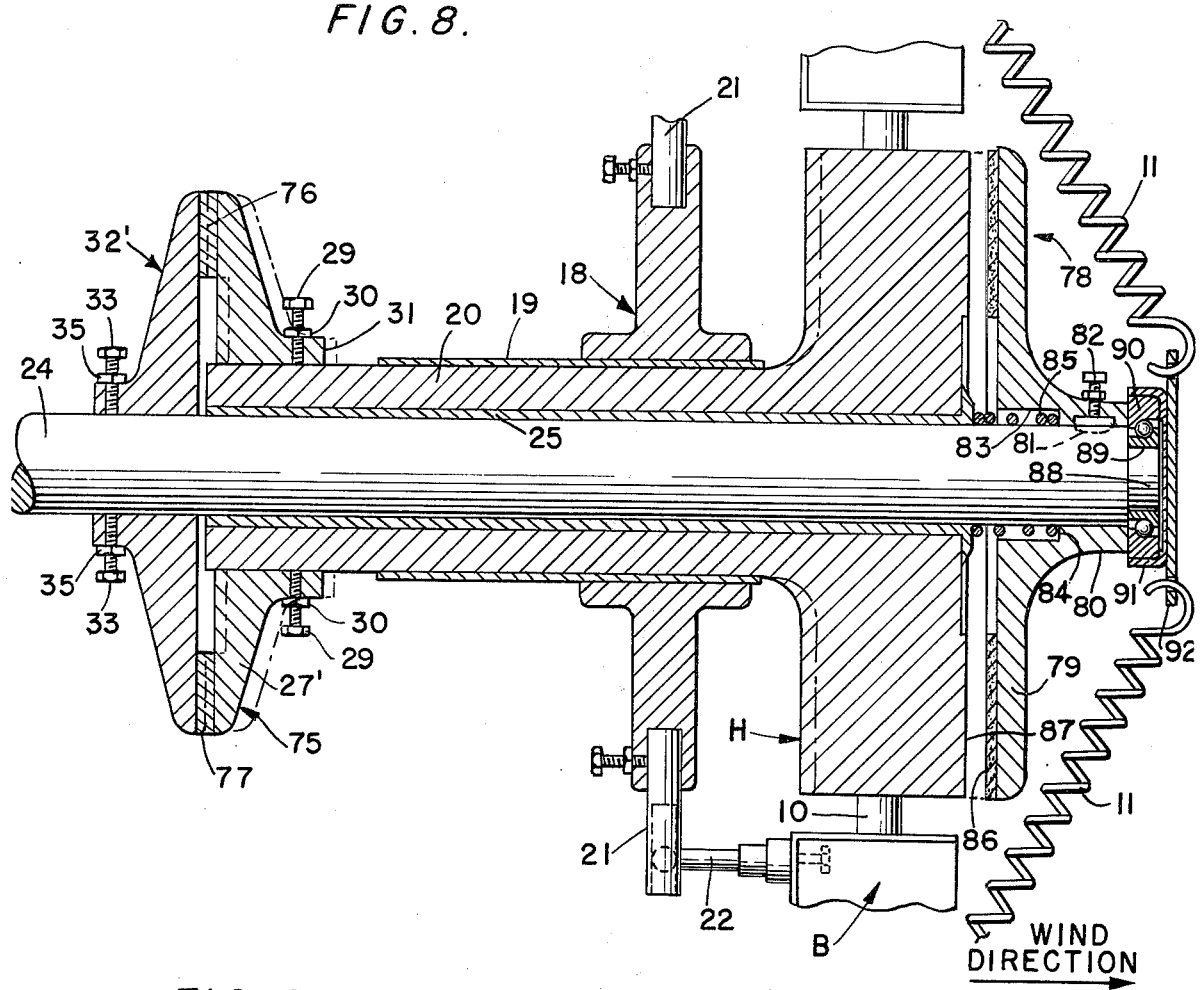
FIG. 8 is a sectional view similar to FIG. 2, of a modified propeller and clutch control, wherein the wind direction is from left to right.

In FIG. 8, a further modified propeller means and clutch control assembly is illustrated, and in this form of the invention, a hub H is mounted for rotation on an output shaft 24 and a bearing sleeve 25 is disposed between the hub and shaft and a propeller blade pitch adjusting yoke 18 is axially and rotatably carried on the hub and a bearing sleeve 19 is disposed between the yoke 18 and extension 20 of the hub H. The propeller blades B are mounted to the hub by means of a plurality of radially extending arms 10, as previously described, and interconnecting socket means 21 and 22 between the yoke and blades effect change in the pitch of the blades as the speed of rotation thereof changes, as previously described. In this form of the invention, however, the propeller is mounted on the downwind side of the tower, and the wind direction is from left to right, as indicated by the arrow. A magnet detent means 75 for controlling engagement of the clutch includes a flange 32', which is secured to the shaft 24 by means of a plurality of set screws 33 and lock nuts 35, and a flange 27' secured to the extension 20 of hub H by means of a plurality of set screws 29 extended through an axial extension 31 of the flange 27' and lock nuts 30 engaged with the set screws 29. Magnets 76 and 77 are carried by the flange 27' and, as seen in FIG. 8, are attracted to the flange 32' to thus urge the hub H to the left, as viewed in FIG. 8. A clutch control means 78 is secured to the end of shaft 24 and comprises a clutch disc or flange 79 having an axial extension 80 thereon, which is secured to the shaft 24 by means of a key 81 and set screw 82. The clutch flange 79 has a recess 83 in the central portion thereof terminating in an axially facing shoulder 84 and a coil spring 85 is engaged between the shoulder and the end of the hub H to urge the hub to the left with the magnets 76 and 77 attracted to and engaged with the flange 32'. A suitable clutch facing material 86 is secured to the clutch flange or disc 79 and is arranged to cooperate with a machined or otherwise suitably formed clutch surface 87 on the hub H. The shaft 24 has a reduced diameter end portion 88 on which the inner race 89 of a bearing is press fitted, and an outer race 90 of the bearing has a cup-shaped cap 91 press fitted thereover. A spring mounting plate 92 is engaged against the cap 91 and is free of securement thereto and the springs 11 are connected with the plate 92, whereby the tension exerted by the springs on the propeller blades is permitted to equalize by movement of the plate 92.

In operation, the hub is in the position shown in FIG. 8 in full lines when at rest under low or no wind conditions, and when the wind velocity increases to a point that it overcomes the attractive force of the magnets 76 and 77, the hub is urged to the right, as seen in phantom lines in FIG. 8, with the clutch facing or surfaces 86 and 87 in contacting engagement to thus impart rotation of the propeller and hub to the output shaft 24.

Figure 9:
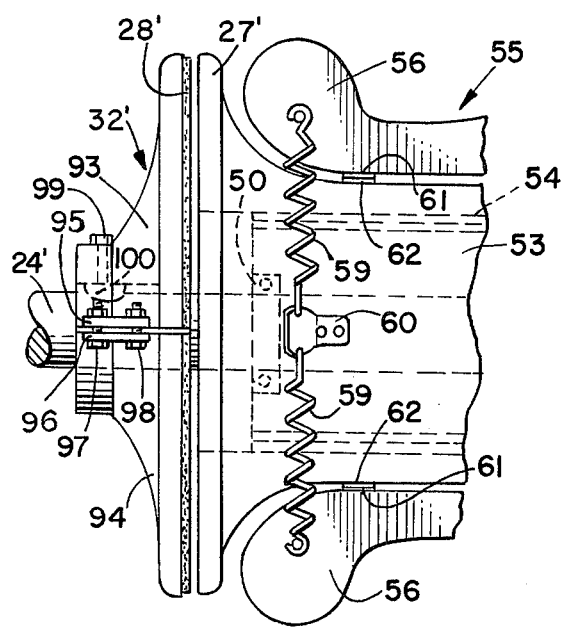
FIG. 9 is a view similar to FIG. 6 of a modified clutch mounting means.
Figure 10:
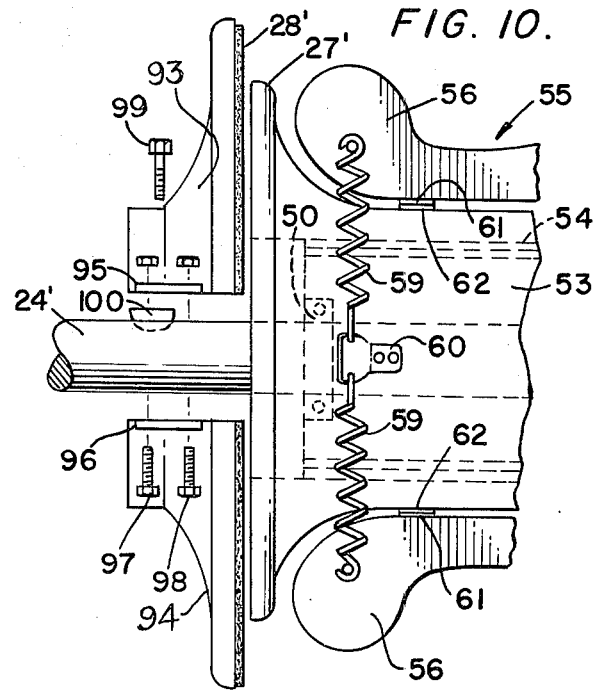
FIG. 10 is a partially exploded view of the clutch mounting means of FIG. 9.

In FIGS. 9 and 10, a modified form of the invention, which utilizes flyweights 56, has a split flange means or clutch plate 32' comprising an upper portion 93 and a lower portion 94 having radially extending ears or flanges 95 and 96 thereon, respectively, with bolts 97 and 98 extended therethrough to secure the upper and lower halves 93 and 94 to the shaft 24', and the clutch flange or plate means 32' is prevented from moving relative to shaft 24' by means of a key 100 and set screw 99. In this form of the invention, the clutch facing 28' is carried by the split flanges 93 and 94, so that the clutch facing may be repaired or replaced simply by removing the upper and lower sections 93 and 94, as seen in FIG. 10, and without disturbing any of the remaining elements of the windmill. Moreover, this form of the invention is equally as effective whether the wind direction is from the left or right, and whether the propeller is upstream or downstream of the support power.

Common to all forms of the invention, however, is the use of magnet means to prevent engagement of the clutch until a predetermined speed has been reached, whereby a positive and secure engagement of the clutch is insured, thus preventing slippage and damage to the clutch, and the invention is thus applied to any type of wind-driven propeller means, whether of the air-foil type or sail wing type, or other, similar structures.

Accordingly, by means of the present invention, a unique and simple means is provided on wind-operated propellers which enables the wind-operated propeller to be used to drive devices which normally require a high starting torque and heretofore have thus been unsuitable for use with wind-operated propellers of the air-foil type due to the low torque generated by such propellers at low rotating speeds. However, wind-operated propellers of the air-foil type produce a high amount of power at their operational speed, and in fact, such propellers generate substantially more power than more conventional windmill type power devices, and accordingly, with the present invention, this increased power is available for use on devices which require high starting torques.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A clutch-controlled, wind-operated, multiblade propeller comprising a hub means rotatable upon a power output shaft, a plurality of propeller blades mounted on the hub means for rotation about the shaft, clutch means connected between the hub means and power output shaft to selectively transmit and interrupt rotation of the hub means to the shaft, clutch operating means connected with the clutch to cause engagement of the clutch when wind velocity and thus speed of rotation of the propeller reaches a predetermined value, and detent means connected with the clutch to prevent engagement of the clutch until said predetermined value is reached.

2. A wind-operated propeller as in claim 1, wherein said detent means comprises a magnet means.

3. A wind-operated propeller as in claim 2, wherein said clutch means includes a first clutch plate connected to the hub and axially movable relative to the shaft, and a second clutch plate fixed on the shaft adjacent the hub means, said first clutch plate slidable into operative power transmitting engagement with the second clutch plate.

4. A wind-operated propeller as in claim 3, wherein a clutch return spring is connected with the first clutch plate to return it to disengaged position when the wind velocity and thus the speed of rotation of the propeller falls below a predetermined value.

5. A wind-operated propeller as in claim 4, wherein the first clutch plate is fixed on the hub means and the hub means is slidable on the shaft.

6. A wind-operated propeller as in claim 5, wherein the clutch operating means comprises the movable hub means, which is caused to move axially on the shaft by wind pressure on the propeller blades.

7. A wind-operated propeller as in claim 6, wherein the magnet means is connected between the shaft and the hub means to magnetically hold the hub means in a forward position on the shaft with the clutch disengaged.

8. A wind-operated propeller as in claim 7, wherein the magnet means comprises a permanent magnet fixed to the forward end of the hub means, and a magnetically attractive bearing means on the shaft forwardly of the hub means in a position to be attracted to and held against the magnet to thus hold the hub means forwardly on the shaft.

9. A wind-operated propeller as in claim 8, wherein the propeller blades are of the air-foil type and a blade pitch adjusting yoke is axially and rotatably movably mounted on the hub means and is connected to the blades of the propeller to change the pitch of the blades as the speed of rotation of the propeller changes.

10. A wind-operated propeller as in claim 7, wherein the clutch return spring is engaged between the bearing means and a hub cover fixed on the forward end of the hub means and projecting forwardly therefrom over the forward end of the shaft.

11. A wind-operated propeller as in claim 4, wherein the first clutch plate is slidable on the hub means.

12. A wind-operated propeller as in claim 11, wherein the hub means is axially fixed on the shaft for rotation between the hub means and shaft by bearing means engaged between the shaft and hub means.

13. A wind-operated propeller as in claim 12, wherein a thrust collar is fixed on the hub means adjacent said first clutch plate, fly weights carried by the first clutch plate and movable outwardly relative to the shaft and hub means and having a thrust surface thereon engageable with the thrust collar to thus cause axial movement of the first clutch plate to engage the clutch.

14. A wind-operated propeller as in claim 13, wherein a first spring means is connected with the first clutch plate to return it to disengaged position, and a second spring means is connected with the fly weights to return them inwardly to their rest position.

15. A wind-operated propeller as in claim 14, wherein said magnet means comprises mutually attracted and engagable magnets carried by the fly weights and the first clutch plate, respectively, to hold the fly weights inwardly until a predetermined speed of rotation is reached.

16. A wind-operated propeller as in claim 15, wherein the propeller blades are of the air-foil type and a blade pitch adjusting yoke is axially and rotatably movably mounted on the hub means and is connected to the blades to change the pitch of the blades as the speed of rotation of the propeller changes.

17. a wind-operated propeller as in claim 15, wherein thrust adjustment bolts are adjustably carried by the thrust collar in a position to engage the thrust surface of the fly weights, whereby the amount of outward movement of the fly weights required to move the first clutch plate into engagement with the second clutch plate may be adjusted.

18. A wind-operated propeller as in claim 3, wherein a clutch facing friction material is carried by the second blutch plate, and said second clutch plate is in two semicircular portions removably secured to the shaft whereby the clutch facings may be required or replaced without disturbing the remaining structural components of the shaft and hub and the like.

* * * * *